Dec. 16, 1969 J. S. HUDSON 3,483,780
CUTTER
Filed July 19, 1967 2 Sheets-Sheet 1

INVENTOR
JESSE S. HUDSON
BY *Seidel & Gonda*
ATTORNEYS.

Dec. 16, 1969  J. S. HUDSON  3,483,780
CUTTER
Filed July 19, 1967  2 Sheets-Sheet 2
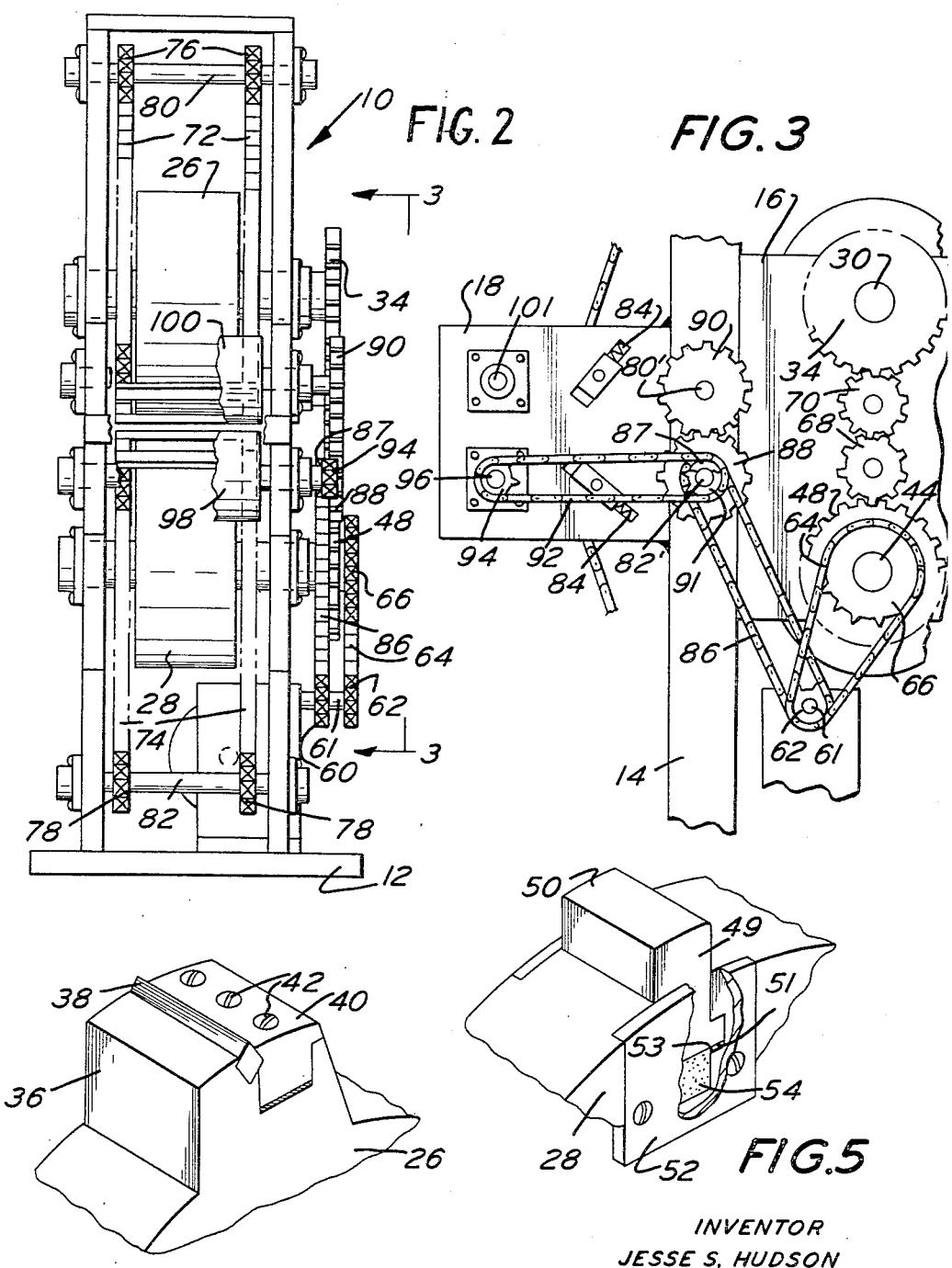
INVENTOR
JESSE S. HUDSON
BY
ATTORNEYS.

United States Patent Office 3,483,780
Patented Dec. 16, 1969

3,483,780
CUTTER
Jesse S. Hudson, Philadelphia, Pa., assignor to Nypel, Inc., West Conshohocken, Pa., a corporation of Delaware
Filed July 19, 1967, Ser. No. 654,591
Int. Cl. B26d 1/56
U.S. Cl. 83—81                                  7 Claims

ABSTRACT OF THE DISCLOSURE

A cutter for pinch-cutting filaments containing abrasives including a rotating cutting blade which cooperates with a rotating anvil. An interference of approximately .015 to .020 inch is provided between the cutting blade and the anvil at the cutting zone to insure a complete pinch-cut. Feed rollers are provided at the entrance end of the cutter to insure movement of material to be cut at a constant rate of speed. Grippers are provided for feeding the material to be cut to the cutting zone and carrying away the material from the cutting zone after it has been cut. The grippers prevent the ends of the cut material from flying out in various diverse directions after the material has been cut. The grippers deliver the cut material to a conveyor. The material is removed from the conveyor by means of a blast of air under pressure.

---

The present invention relates to a cutter and more particularly to a cutter for cutting filaments containing abrasives.

It is desirable to manufacture filaments containing abrasives in a continuous process. The filaments or strands containing abrasives may be extruded at a rate of approximately 360 linear feet per minute. The abrasives encapsulated in the filaments include materials such as aluminum oxide, diamond grit, tungsten carbide, etc. The filaments are composed of a thermoplastic material in which the abrasive grit is encapsulated. Conventional cutters such as those employing conventional steel cutting blades have not proven satisfactory in cutting filaments into desired unit lengths. It has been found that a conventional steel cutting blade is rapidly dulled due to the abrasiveness of the grit encapsulated in the filaments which the blade contacts. It has further been determined that a shearing action has been unsatisfactory since the life of the blade utilized is relatively short due to constant contact with the abrasive grit. Further, it is most undesirable to have continual replacement of blades since the entire process must be delayed while a new blade is provided. After the filaments are cut, due to the speed of movement of the filaments, it has been found that the ends will tend to disperse and fly out in various directions. This has created problems in conveying the cut filaments from the cutting zone.

It is an object of the present invention to provide a cutter for filaments having abrasives encapsulated therein which overcomes the deficiencies of prior art cutters.

It is another object of the present invention to provide a cutter for filaments having abrasives encapsulated therein which rapidly and efficiently pinch-cuts the filaments.

It is still another object of the present invention to provide a cutter for filaments having abrasives encapsulated therein wherein the cutter will effectively and efficiently cut a plurality of filaments moving at a rate of speed of 360 linear feet per minute.

It is a further object of the present invention to provide a cutter for filaments having abrasives encapsulated therein which is highly effective in use.

It is a still further object of the present invention to provide a cutter for filaments having abrasives encapsulated therein which includes means for conveying the material towards and away from the cutting zone and which means prevent the ends of the material from flying out in various diverse directions.

It is yet another object of the present invention to provide a cutter for filaments having abrasives encapsulated therein wherein an interference of approximately .015 to .020 inch is provided between the cutting blade and the anvil at the cutting zone.

It is yet a further object of the present invention to provide a cutter for filaments having abrasives encapsulated therein which has conveying means associated therewith for conveying the cut filaments to a desired location.

Other objects will appear hereinafter.

The above and other objects are accomplished by means of the present invention. The cutter includes a rotating wheel having a knife blade secured thereto. The knife blade may be a T–15 high speed cobalt steel blade. A rotating anvil is mounted adjacent the wheel to which the knife is secured and a cutting zone is defined therebetween. The anvil has a hard metal surface thereon. The cutting blade and the anvil will cooperate to pinch-cut the filaments therebetween. At the cutting zone, an interference is provided between the cutting knife and the anvil of approximately .015 to .020 inch. The interference ensures an effective pinch-cut of the filaments. The anvil and the blade are rotated at the same rate of speed.

A pair of feed rollers are mounted at the entrance end of the cutter. The rollers feed the filaments to the cutter at a constant rate of speed. One of the feed rollers may be composed of an elastomeric material and the other feed roller may have a metal surface thereon. The elastomeric material on the feed roller may have a durometer hardness of 70–90.

A plurality of grippers are mounted on an upper chain and a lower chain. The chains are double-stranded and the grippers extend between the strands of the upper and lower chains. The upper and lower chains travel along paths which converge at the entrance end of the cutter and remain in close adjacency until the cut material has been deposited onto a conveyor. The grippers on the upper chain cooperate with the grippers on the lower chain to grip the material to be cut therebetween and facilitate movement of the material through the cutter. The grippers also prevent the material from flying out in diverse directions after it has been cut. The grippers deliver the cut material to a conveyor. The conveyor conveys the material to a desired location at which point an air hose may be operated to cause the material to be discharged from the conveyor into a suitable receptacle.

A resilient material may be provided beneath the anvil in order to absorb shock at the cutting zone. Suitable tension is provided for the chains on which the grippers are mounted by spring-loading at least one sprocket about which each chain is mounted.

For the purpose of illustrating the invention, there is shown in the drawings a form which is presently preferred; it being understood, however, that this invention is not limited to the precise arrangements and instrumentalities shown.

FIGURE 2 is a front elevation view partially in section taken along line 2—2 of FIGURE 1;

FIGURE 3 is a side elevation view taken along line 3—3 of FIGURE 2;

FIGURE 4 is an enlarged perspective view of a portion of the cutter roller; and

FIGURE 5 is an enlarged perspective view of a portion of the anvil roller.

Figure 1:
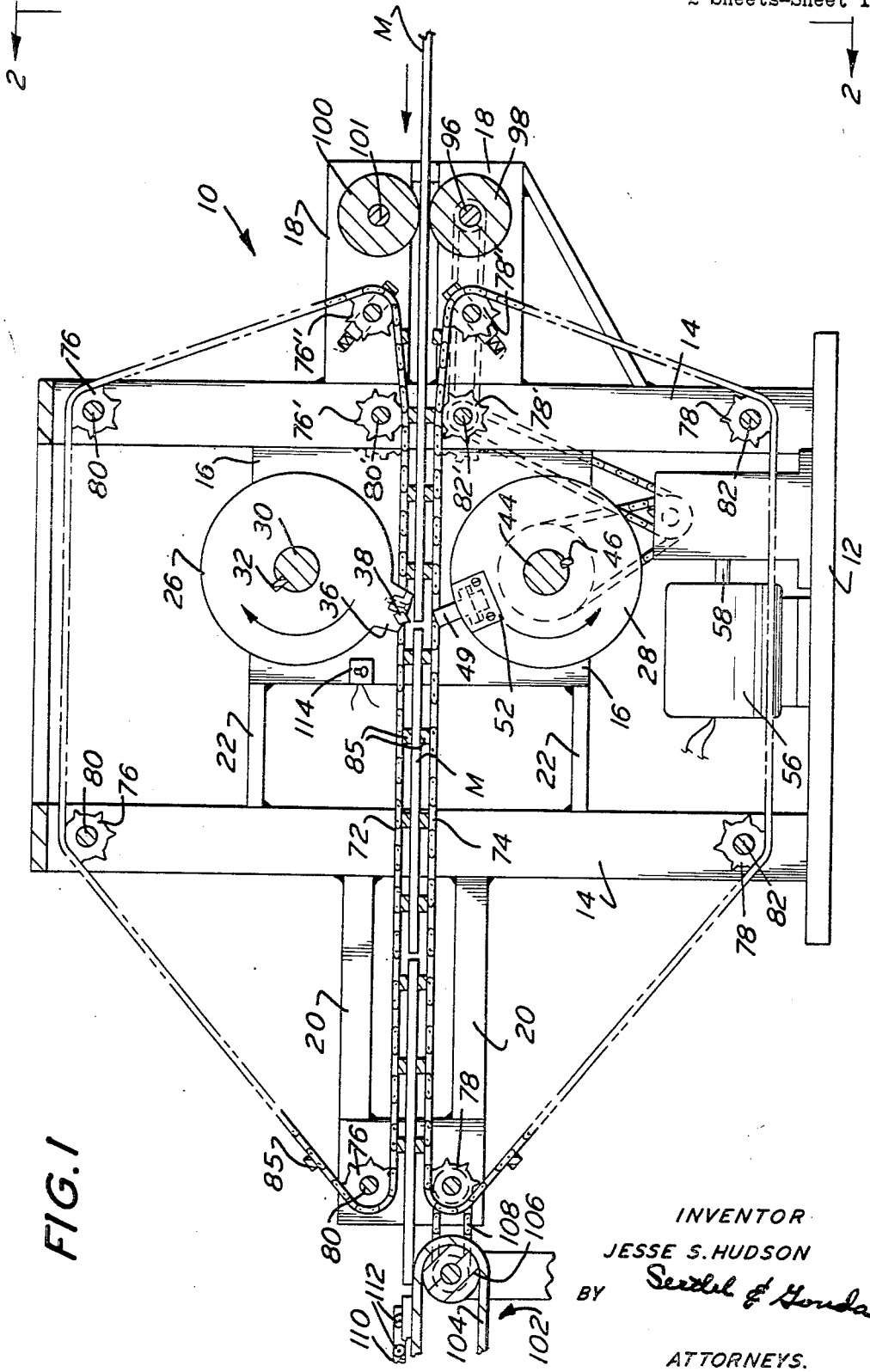
FIGURE 1 is a side view of a cutter partially in section with a portion of the frame removed embodying the features of the present invention.

Referring now to the drawings in detail wherein like numerals indicate like elements throughout the several views, there is shown in FIGURE 1 a cutter generally designated by the reference numeral 10.

The cutter 10 has a base 12 which has upright standards 14 projecting therefrom. The cutter 10 is provided with side plates 16 which are attached to the upright standards 14. Forwardly projecting arms 18 and rearwardly projecting arms 20 are secured to the upright standards 14. The arms 18 and 20 may be welded, bolted, or secured to the standards 14 in any other desired conventional manner.

The side plates 16 have projecting arms 22 which arms are connected to the rear set of standards 14 (the forward end of the cutter is to the right in FIGURE 1). Alternatively, the side plates 16 could be solid between the forward and rear standards 14. Use of the arms 22 is preferred since visual inspection of the cutting mechanism is facilitated.

A cutter roller 26 and an anvil roller 28 are mounted on shafts which are suitably supported for rotation by bearings in the side plates 16. The cutter roller 26 is fixedly connected to a shaft 30 by means of a key 32. The shaft 30 has a gear 34 fixedly connected thereto. The cutter roller 26 has a projecting portion 36 in which a blade 38 is mounted. A lock block 40 is provided for locking the blade in the position illustrated in FIGURE 4. Suitable set screws or Allen nuts 42 may be utilized to secure the lock block 40 to the cutter roller 26. The blade 38 is preferably made from T–15 high speed cobalt steel and a new cutting edge may be provided by merely removing the lock block 40 and rotating the blade 90°.

The anvil roller 28 is fixedly secured to a shaft 44 by means of a key 46. A gear 48 is fixedly attached to the shaft 44 for rotation therewith. The anvil roller 28 has an anvil surface 50 carried on an anvil member 49. The anvil member 49 has an inverted T-shape in cross-section (see FIGURE 5) and is received within a slot 51 in the anvil roller 28. The slot 51 has a recess therein which receives a block 54 of hard elastomeric material. The block 54 may extend several thousandths of an inch above the top surface 53 of the slot 51. The anvil member rests upon the block 54 of hard elastomeric material which absorbs the shock of contact between the anvil member and the cutting blade in the cutting zone. A plate 52 locks the anvil member 49 into position.

The cutter 10 is provided with a motor 56. The motor 56 has a shaft 58 connected thereto. Rotation of the shaft 58 is adapted to cause the rotation of a sprocket 60 by means of any suitable motor transmission conventional linkage. The sprocket 60 is fixedly attached to a shaft 61 for rotation therewith. A sprocket 62 is also secured to the shaft 61 and is adapted to rotate therewith.

A chain 64 interconnects sprocket 62 and a sprocket 66. The sprocket 66 is fixedly secured to the shaft 44 which also supports the anvil roller 28 for rotation therewith. The gear 48 which is also secured to the shaft 44 meshes with a pair of idlers 68 and 70. Idler 70 meshes with gear 34 (FIGURE 3). Rotation of the shaft 44 will thus cause rotation of the shaft 30 to which the gear 34 is secured. The gear 34 and the gear 48 have the same number of teeth thereon and are rotated at the same speed. The distance from the diameter of the shaft 30 to the of the blade 38 is substanially the same as the distance from the center of the shaft 44 to the anvil surface 50.

An upper chain 72 and a lower chain 74 are supported for movement by the frame of the cutter 10. The chains 72 and 74 are double-stranded. The path of the upper chain 72 is defined by a plurality of sprockets 76 rotatably mounted on shafts 80 on the upper portion of the frame of the cutter. The path of the lower chain 74 is defined by a plurality of sprockets 78 rotatably mounted on shafts 82 on the lower portion of the frame of the cutter. Driving sprockets 76' and 78' are fixedly secured to their respective shafts 80' and 82'. The sprockets 76' and 78' impart movement to the chains 72 and 74. The sprockets 76" and 78" are spring-loaded by suitable springs 84 to insure the desired tension in the upper and lower chains 72 and 74 respectively. The path of movement of the chain 72 on the upper portion of the frame is substantially identical to the path of movement of the chain 74 on the lower portion of the frame.

The chains 72 and 74 are identical and therefore only chain 72 need be described in detail. The chain 72 is double-stranded and each strand may be mounted about sprockets 76 provided adjacent opposite ends of the shafts 80. The strands are interconnected by grippers 85 as will be discussed in detail hereinafter. The strands are spaced apart at a distance greater than the width of the knife 38 and the anvil surface 50 to insure non-interference with the knife and the anvil surface at the cutting zone. Suitable non-removable links, other than the grippers 85 may also interconnect the strands of the chain 72. The lower chain 74 is also double-stranded and may be identical in all respects to the chain 72.

Both the upper chain 72 and the lower chain 74 are provided with a plurality of grippers 85 thereon. The grippers 85 are removably secured to the upper and lower chains at predetermined spaced intervals. The chains are arranged so that the grippers on the lower chain will be opposite grippers on the upper chain in the cutting zone. Opposing grippers will cooperate to grip material to be cut therebetween and will feed material to the cutting zone and convey cut material away from the cutting zone. The material to be cut, designated in FIGURE 1 by M, is received between each pair of grippers 85 and fed to the cutting zone.

The grippers 85 are so positioned so they will not interfere with the cutting which takes place at the cutting zone. However, the grippers are placed so that the material M will be gripped and tautly held immediately adjacent the position wherein the material M is severed. Each of the grippers 85 may be composed of a relatively hard elastomeric material. The paths of the chains 72 and 74 converge at the entrance end of the cutter and remain in close adjacency until the cut material is delivered to a conveyor at the exit end of the cutter. The grippers 85 firmly grip the matererial M therebetween. Thus, the grippers 85 will prevent the material from flying out and will deliver the cut material to a conveyor 102 as will be hereinafter fully explained in detail.

A drive chain 86 interconnects the sprocket 60 with a sprocket 87 which is fixedly secured to the shaft 82'. Rotation of the motor 56 causes rotation of the shaft 82' and the sprocket 78' fixedly secured to the shaft 82'.

A gear 88 is also fixedly secured to the shaft 82'. The gear 88 meshes with a gear 90. The gear 90 is fixedly secured to the shaft 80'. Thus, rotation of the gear 88 will cause rotation of the gear 90 and rotation of the sprocket 76' fixedly secured to the shaft 80'.

A sprocket 91 is also secured to shaft 82' for rotation therewith. A drive chain 92 interconnects sprocket 91 with a sprocket 94 supported on the forwardly projecting arms 18. The sprocket 94 is fixedly connected to a shaft 96 for rotation therewith. A lower drive roller 98 is also fixedly connected to shaft 96. Rotation of the sprocket 94 will cause rotation of lower drive roller 98. An upper drive roller 100 is mounted on a shaft 101 above the drive roller 98. The shaft 96 and the shaft 101 may carry intermeshing gears causing rotation of the rollers 98 and 100 in opposite directions at the same rate of speed. The rollers 98 and 100 are sufficiently close so that rotation of roller 98 will be transmitted through the material M to the roller 100 and therefore it is not necessary to positively drive roller 100.

The drive rollers 98 and 100 grip the material M therebetween and feed the material to the cutter at a substantially uniform rate of speed. One drive or pressure roller may be composed of elastomeric material having a hardness of 70–90 durometer and the other roller may have a metal surface.

After material M has been cut it is retained between the grippers 85 and fed to a conveyor 102. The conveyor 102 is a conventional endless conveyor and has a belt 104 which travels around a roller 106 and another roller (not shown). A drive chain 108 may interconnect the roller 106 with a sprocket mounted on a shaft 82 adjacent the conveyor 102. When a sprocket is mounted on the shaft 82 means will be provided for interconnecting such sprocket with the shaft 78 for rotation therewith.

An air hose 110 having air holes 112 therein may be provided adjacent the conveyor 102. Air will be emitted under pressure through the air holes 112 in the hose 110 at predetermined intervals. The emission of air through the holes 112 may be controlled by a switch 114. The switch 114 would be operated upon each rotation of the cutter roller 26. Thus, the projecting portion 36 of the cutter roller 26 could be adapted to trip the switch 114 and thus cause air under pressure to be emitted through the air holes 112. The air under pressure would blow the material M off the conveyor into a suitable chute or container.

It is believed that the operation of the cutter is readily apparent from the above description. Material M as viewed in FIGURE 1 travels from the right to the left. The material is gripped between the rollers 98 and 100 and fed at a substantially uniform rate of speed to the cutting zone. The material M is gripped by the grippers 85 on the upper and lower chains 72 and 74. The material M will be cut upon each rotation of the cutter roller 26 and the anvil roller 28. The material M will be held between spaced pairs of grippers 85 and fed to a conveyor 102. The conveyor 102 will convey the material to a desired location wherein it may be blown off the conveyor 102 by compressed air or removed from the conveyor in any suitable desired manner.

Both the cutter roller and the anvil roller may be composed of steel. The surface 51 of the anvil member 49 may be composed of a hard wear resistant steel.

The present invention may be embodied in other specific form without departing from the spirit or essential attributes thereof and, accordingly, reference should be made to the appended claims, rather than to the foregoing specification as indicating the scope of the invention.

I claim:

1. Apparatus for cutting filaments containing abrasives comprising a frame, a cutting blade and an anvil supported by said frame, a cutting zone defined between said cutting blade and anvil, means for rotating said cutting blade and said anvil, feed means for feeding material to be cut at a substantially uniform rate of speed, said feed means including opposed endless conveying means containing spaced gripping means which converge to grip the filaments therebetween at the entrance end of the cutting zone and cooperate to grip and convey said filaments to and through said cutting zone.

2. Apparatus as set forth in claim 1 wherein said gripping means are carried on upper and lower chains, said feed means including feed rollers supported by said frame, and said anvil including means for absorbing shock.

3. Apparatus as set forth in claim 1 wherein said means for rotating said cutting blade and anvil is synchronized with said gripping means to insure that material is gripped by said gripping means immediately adjacent the cutting zone and to further insure non-interference between said gripping means and said cutting blade and anvil.

4. Apparatus as set forth in claim 1 including conveyor means adjacent said gripping means for receiving and conveying cut material, and means for discharging cut material from said conveyor including a switch associated with said cutting blade, said switch being operated upon each rotation of said cutting blade to initiate operation of said means for discharging cut material from said conveyor.

5. Apparatus as set forth in claim 4 wherein said upper and lower chains are double-stranded, said gripping means includes spaced grippers composed of a hard elastomeric material interconnecting the strands of said upper chain, said gripping means further including spaced grippers interconnecting the strands of said lower chain, said grippers on said upper and lower chain converging at the entrance end of said cutting apparatus to grip material to be cut therebetween.

6. Apparatus as set forth in claim 2 wherein said gripping means include grippers comprised of a hard elastomeric material on said upper and lower chains.

7. Cutting apparatus comprising a frame, a cutting blade and an anvil, supported by said frame, a cutting zone defined between said cutting blade and anvil, means for rotating said cutting blade and said anvil, feed means for feeding material to be cut at a substantially uniform rate of speed, said feeding means including spaced movable gripping means for gripping material to be cut therebetween, conveying material to be cut to said cutting zone, through said cutting zone and away from said cutting zone, said blade and anvil having an interference of approximately .015 to .020 inch at said cutting zone to insure complete severing of material to be cut, conveyor means adjacent said gripping means for receiving and conveying cut material, and means for discharging cut material from said conveyor means including a switch operatively associated with said cutting blade, said switch being operated upon rotation of said cutting blade to initiate operation of said means for discharging cut material from said conveyor.

References Cited

UNITED STATES PATENTS

| 3,008,364 | 11/1961 | Stobb | 83—346 X |
| 3,174,372 | 3/1965 | Huck | 83—346 X |
| 3,247,744 | 4/1966 | Huck | 83—325 X |
| 3,269,236 | 8/1966 | Johnson et al. | |

JAMES M. MEISTER, Primary Examiner

U.S. Cl. X.R.

83—98, 151, 155, 325, 346, 348, 409, 423

PO-1050
(5/69)

UNITED STATES PATENT OFFICE
CERTIFICATE OF CORRECTION

Patent No. 3,483,780  Dated December 16, 1969

Inventor(s) Jesse S. Hudson

It is certified that error appears in the above-identified patent and that said Letters Patent are hereby corrected as shown below:

Column 3, line 52 "motor" should be --motion--;

Column 4, line 37 after positioned so add --that--;

Column 5, line 40 after in any add --other--;

Column 6, line 19, Claim 5 "4" should be --2--.

SIGNED AND
SEALED
JUN 16 1970

(SEAL)
Attest:

Edward M. Fletcher, Jr.
Attesting Officer

WILLIAM E. SCHUYLER, JR.
Commissioner of Patents